United States Patent [19]

Kaneko et al.

[11] Patent Number: 5,251,202
[45] Date of Patent: Oct. 5, 1993

[54] OPTICAL INFORMATION RECORDING MEDIUM HAVING MULTI-LAYERED STRUCTURES FOR PREVENTING UNDESIRED REFLECTION AND ELECTRIC CHARGING

[75] Inventors: Yujiro Kaneko, Machida; Wasaburo Ohta, Yokohama; Masashi Nakazawa, Yokohama; Michiaki Shinozuka, Yokohama; Isao Miyamoto, Yokohama; Hitoshi Nakamura, Kawasaki; Toshihiko Yoshio, Yonago; Masaaki Ishiyama; Yuuzi Onodera, both of Hanamaki, all of Japan

[73] Assignee: Ricoh Company, Ltd., Tokyo, Japan

[21] Appl. No.: 883,297

[22] Filed: May 14, 1992

[30] Foreign Application Priority Data

May 23, 1991 [JP] Japan ................................ 3-147953
May 31, 1991 [JP] Japan ................................ 3-155436

[51] Int. Cl.$^5$ .............................................. G11B 7/24
[52] U.S. Cl. ............................... 369/286; 369/275.5; 369/288; 369/284
[58] Field of Search ........................ 369/275.1-275.5, 369/284, 286, 288, 13; 360/59, 114; 365/122

[56] References Cited

U.S. PATENT DOCUMENTS

| | | | |
|---|---|---|---|
| 4,586,092 | 4/1986 | Martens et al. | 369/13 |
| 4,658,388 | 4/1991 | Ishiwatari et al. | 369/13 |
| 4,831,608 | 5/1989 | Tsukane et al. | 369/286 |
| 5,013,594 | 5/1991 | Mizumura et al. | 369/275.1 |

FOREIGN PATENT DOCUMENTS

| | | | |
|---|---|---|---|
| 63-69044 | 3/1988 | Japan. | |
| 1-100257 | 4/1989 | Japan. | |
| 1-119934 | 5/1989 | Japan | 369/284 |
| 1-298545 | 12/1989 | Japan. | |

Primary Examiner—Hoa T. Nguyen
Attorney, Agent, or Firm—Cooper & Dunham

[57] ABSTRACT

An optical information recording medium is composed of a transparent substrate, a recording layer provided on the substrate, which is transparent with respect to a light beam for reproducing information recorded in the recording layer, a reflection layer provided on the recording layer, and an anti-reflection layer provided on the back side of the substrate opposite to the recording layer. The anti-reflection layer is composed of a plurality of overlaid layers, and at least one of the layers being a transparent electroconductive layer and the other layers are transparent insulating layers.

22 Claims, 1 Drawing Sheet

OPTICAL INFORMATION RECORDING MEDIUM HAVING MULTI-LAYERED STRUCTURES FOR PREVENTING UNDESIRED REFLECTION AND ELECTRIC CHARGING

BACKGROUND OF THE INVENTION

1. Field of the Invention

The present invention relates to an optical information recording medium for recording information and reproducing the recorded information accomplished by application of a laser beam thereto, and more particularly to an optical information recording medium comprising a transparent substrate, a recording layer provided on the substrate, a reflection layer provided on the recording layer, and an anti-reflection layer provided on the back side of the substrate opposite to the recording layer, the anti-reflection layer comprising a plurality of overlaid layers, at least one of the layers being a transparent electroconductive layer.

2. Discussion of Background

Optical information recording media for recording information and reproducing the recorded information are widely known in the form of optical discs for movie films as well as optical audio discs, write-once type discs, and the like. Among these, an example of a magneto-optical recording disc on which rewriting is possible has been proposed in Japanese Patent Publication 62-27458. This magneto-optical recording disc comprises a recording layer composed of an amorphous rare earth element - transition metal alloy, such as TbFeCo or TbDyFeCo, sufficiently as thin as less than 400 Å to transmit a laser beam, on which a reflecting layer is provided. A superior point of this structure is that it provides a reproduction signal with high intensity since both the Kerr effect and the Faraday effect can be utilized in this magneto-optical recording disc.

It can be said that the reproduction signal should be as intense as possible because the recording mark is minimized as the recording density and capacity are increased. Accordingly, a method of improving the reproduction characteristics has been proposed, as disclosed in Japanese Laid-Open Patent Application 59-79445, wherein an anti-reflection film layer is added to the above-mentioned structure, provided on the side of the substrate at which the laser beam enters, thereby reducing the reflection of the laser beam from the substrate surface as far as possible.

On the other hand, materials with high electrical resistance, for example, plastics such as polycarbonate resin and acrylic resin, and glass are used as the material for the substrate which supports a recording layer in an optical information recording medium. For this reason, there is usually a tendency for the optical information recording medium to become electrically charged. When the optical information recording medium becomes charged, minute particles of dust adhere to the outer surface of the medium because of static electricity. This hinders the write-in or read-out of the information, or causes malfunction of electronic circuits. With the object of preventing such an electric charge on the optical information recording medium, it has been proposed that a charge prevention layer be provided on the outer surface of the optical information recording medium (Japanese Laid-Open Patent Application 60-239946). It is desirable that the surface of the substrate of the optical information recording medium have the dual functions of preventing reflection and electric charging as outlined above, but an optical information recording medium provided with these two functions is not conventionally known.

SUMMARY OF THE INVENTION

Accordingly, an object of the present invention is to provide, with due consideration to the drawbacks of such conventional devices, a highly reliable optical information recording medium comprising a substrate, a recording layer formed on the substrate, and a reflection layer formed on the recording layer, capable of producing intensive reproduction signals by the application of a laser beam, and to which dirt and dust can adhere only with difficulty, by the provision of a multiple-layered film layer which has the two functions of preventing reflection at the laser beam incident side of the substrate for the optical information recording medium, and preventing electric charging.

The object of the present invention can be achieved by an optical information recording medium comprising a transparent substrate, a recording layer provided on the substrate, which is transparent with respect to a light beam for reproducing information recorded in the recording layer, a reflection layer provided on the recording layer, and an anti-reflection layer provided on the back side of the substrate opposite to said recording layer, the anti-reflection layer comprising a plurality of overlaid layers, at least one of the layers being a transparent electroconductive layer.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
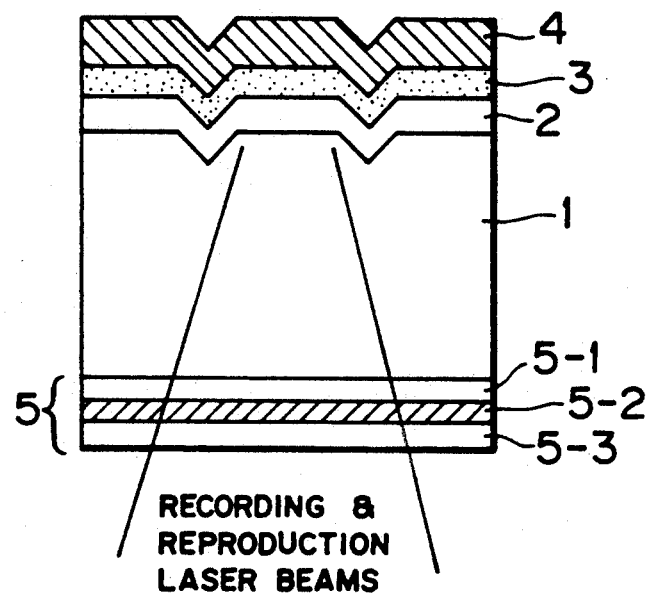
FIG. 1 is a schematic cross-sectional view of an example of an optical recording medium according to the present invention.

The present invention will now be explained in detail, with reference to FIG. 1 which illustrates one example of the optical recording medium.

FIG. 1 is a schematic cross-sectional view of an example of an optical recording medium according to the present invention. An interference layer 2, a recording layer 3, and a reflection layer 4 are successively overlaid on a pregrooved surface of a transparent substrate 1. On the surface of the other side of the substrate 1, specifically, the surface at which a recording or reproduction laser beam enters, an anti-reflection layer 5 is formed. This anti-reflection layer 5 is of a three-layered type, which is composed of a first transparent insulating film layer 5-1, a transparent electroconductive film layer 5-2, and a second transparent insulating film layer 5-3, which are successively overlaid on the substrate 1.

Examples of the transparent substrate 1 for use in the present invention include plastic substrates fabricated from resins such as polycarbonate (PC), polymethyl methacrylate (PMMA), or amorphous polyolefin (APO); and substrates composed of a glass substrate and a pregrooved resin layer formed on the glass substrate. The substrate is in the form of a disc with a thickness of about 0.6 mm to 1.2 mm.

Examples of the recording layer 3 for use in the present invention include an amorphous rare earth element—transition metal alloy layer comprising, for example, TbFeCo, NdDyFeCo, or TbDyFeCo; an oxide layer comprising, for example, $BaFe_{12}O_{19}$, $CoFe_2O_4$, or $(Bi, Y)_3Fe_5O_{12}$; and a polycrystalline alloy layer comprising, for example, MnBi, or CoPt. All of these have an axis of easy magnetization perpendicular to the surface of the recording layer. In the case of the amorphous rare earth element—transition metal alloy layer, a preferable thickness is 200 Å to 400 Å. In the case of the oxide layer, there is no particular limitation to the thickness thereof, but a thickness of 1000 Å to 5000 Å is preferable because most of the oxide layers have high transparency to the laser beam for recording or reproduction. The recording layer 3 is not limited to a single-layer film. A multi-layer film is also acceptable.

In the present invention, the interference layer 2 may be interposed between the substrate 1 and the recording layer 3. As the interference layer 2, a transparent film layer with a high refractive index (1.8 or higher) is used. The interference layer 2 gives rise to the multiple reflections of the laser beam for reproduction. Using the multiple reflections, the apparent Kerr rotation angle is increased, so that the carrier level of this recording medium is raised. Furthermore, the reflectance of the recording medium is decreased, so that the noise level is reduced. As a result, the C/N ratio is improved by the interference layer 2. In addition, in the case where the recording layer 3 is composed of an amorphous rare earth element—transition metal alloy, in which there is a tendency for corrosion from oxidation or the like to occur, such as an amorphous thin film layer made from an alloy of a the interference layer 2 must also fulfil a second role as a protective layer to prevent oxidation of the recording layer 3. In order to fulfil this role, the interference layer 2 must prevent the entrance of water and oxygen in the air or in the substrate 1, and must have high corrosion resistance, and substantially no reactivity with the recording layer 3.

Examples of specific materials for use in the interference layer 2 which can be given include metal oxides such as SiO, $SiO_2$, $Al_2O_3$, and $Ta_2O_5$; nitrides of Si, Al, Zr, and Ge; inorganic carbides such as $B_4C$ and SiC; and metal sulfides such as ZnS. These may be used in a composite form, for example, in the form of SiAlON, SiZrN, or in a multi-layered form. The interference layer 2 generally has a thickness in the range of 500 Å to 2000 Å, and preferably has a thickness in the range of 800 Å to 1200 Å, although the optimum thickness thereof depends upon the refractive index thereof.

When the above interference layer is provided between the substrate 1 and the recording layer 3, it is preferable to further provide an electroconductive layer between the transparent substrate and the interference layer, so that the transparent substrate has a sheet resistance of 10 kΩ/□ or less on the side on which the interference layer is provided.

The electroconductive layer interposed between the transparent substrate 1 and the interference layer may be a metal layer. It is preferable that the metal layer have a thickness of 30 Å to 150 Å to obtain a sufficient effect as an electroconductive layer, and an appropriate transparency to a laser beam for recording information or reproducing the recorded information.

Furthermore, it is preferable that the metal layer be made of a metal such as Au, Ag, Cu, Pd, Pt, Al, Cr or Rh, or alloys comprising one of these metals.

In the present invention, the reflection layer 4 is provided directly on the recording layer 3 or through another interference layer. It is preferable that the reflection layer 4 have as high as possible reflectivity with respect to the laser beam for reproduction.

Specific examples of a material for the reflection layer 4 are metals such as Al, Cu, Ag, Ti, Au, and Pt and alloys of any of these metals.

In the present invention, the anti-reflection layer 5 is provided on the side of the transparent substrate 1 at which the recording and reproduction laser beams enters. The anti-reflection layer 5 comprises a plurality of overlaid layers, at least one of the overlaid layers being a transparent electroconductive layer.

The structure of the anti-reflection layer 5 is designed, with the refractive index of the substrate taken into consideration, based on the conventional design theory for anti-reflection layers, which is widely applied for optical parts and the like.

It is preferable that the anti-reflection layer 5 comprise (a) a transparent insulating layer of magnesium fluoride, silicon monoxide, silicon dioxide, titanium oxide, cerium oxide, or aluminum oxide, which is conventionally used as an anti-reflection layer for optical parts, and (b) a transparent electroconductive layer of an inorganic material such as $In_2O_3$, ITO, $SnO_2$, or ZnO, with a refractive index of about 2 (n=2). Each of the layers contained in the anti-reflection layer 5 is so thin that even if the transparent electroconductive layer is not provided directly on top of the anti-reflection layer 5, the transparent electroconductive layer can provide an adequate charge-prevention effect.

As shown in FIG. 1, the anti-reflection layer 5 comprises three film layers, specifically, a transparent insulating layer 5-1, a transparent electroconductive layer 5-2 formed on the transparent insulating layer 5-1, and a transparent insulating layer 5-3 formed on the transparent electroconductive layer 5-2. In other words, the transparent electroconductive layer 5-2 is interposed between the transparent insulating layers 5-1 and 5-3.

However, as previously outlined, the position of the transparent electroconductive layer 5-2 is optional in the present invention. The number of the transparent electroconductive layers and transparent insulating layers used in the construction of the anti-reflection layer 5 is also optional.

The interference layer 2, the recording layer 3, the reflection layer 4 and the anti-reflection layer 5 can be formed by physical evaporation methods such as sputtering, ion plating, or the like, or by chemical evaporation methods such as plasma CVD or the like.

In the optical recording medium as shown in FIG. 1, another interference layer can be further interposed between the recording layer and the reflection layer, and a cover layer made from an ultraviolet-curable resin can be provided on the reflection layer. In addition, these layer surfaces may also be bound together by means of an adhesive without adverse effect on the present invention.

Other features of this invention will become apparent in the course of the following description of exemplary embodiments, which are given for illustration of the invention and are not intended to be limiting thereof.

EXAMPLE

A magneto-optical recording disc which is an example of an optical information recording medium according to the present invention, with the structure as shown in FIG. 1, was fabricated, using a substrate of polycarbonate, with a diameter of 130 mm and a thickness of 1.2 mm, with the following composition and thickness of each layer as shown in the following Table 1:

TABLE 1

|  | Composition | Thickness |
|---|---|---|
| Substrate | Polycarbonate | 1.2 mm |
| Interference Layer | $Si_3N_4$ | 100 nm |
| Recording Layer | TbDyFeCo | 20 nm |
| Reflection Layer | AlTi | 50 nm |
| Antireflection Layer |  |  |
| First Transparent Insulating Layer | SiO | 116 nm |
| Transparent Electroconductive Layer | $In_2O_3$ | 52 nm |
| Second Transparent Insulating Layer | $SiO_2$ | 228 nm |

COMPARATIVE EXAMPLE

A comparative magneto-optical recording disc was fabricated in the same manner as for the above magneto-optical recording disc of the present invention, with the exception that the anti-reflection layer provided in the above Example was not provided.

The C/N ratios of the these magneto-optical recording discs fabricated as outlined above were measured under the following conditions:

Recording

Laser beam wavelength: 830 nm
CAV: 1800 rpm
Frequency: 3.7 MHz
Duty ratio: 22%
Recording power: Value at which maximum C/N ratio is given Reproduction CAV: 1800 rpm
Reproduction power: 1 mW
The results are shown in the following Table 2:

TABLE 2

|  |  | Bit Error Ratio (BER) | |
|---|---|---|---|
|  | C/N(dB) | Before Durability Test | After Durability Test |
| Example | 54.5 | *$2.28 \times 10^{-6}$ | *$2.30 \times 10^{-6}$ |
|  |  | **$1.58 \times 10^{-6}$ | **$1.44 \times 10^{-6}$ |
| Comparative | 52.6 | *$2.34 \times 10^{-6}$ | *$5.23 \times 10^{-5}$ |
| Example |  | **$4.89 \times 10^{-6}$ | **$1.01 \times 10^{-5}$ |

*Shelf
**Archival

As can be seen from Table 2, the C/N ratio of the Example of the present invention is about 2 dB higher than that of the Comparative Example.

In addition, a magneto-optical recording disc with two recording surfaces (front and back) was fabricated by joining two of each magneto-optical recording disc by means of an adhesive, and was subjected to a forced durability test in which the magneto-optical recording disc was exposed to dust, which was equivalent to an actual 10 year durability test, to investigate the BER. The results are shown in Table 2.

The BET of the comparative magneto-optical recording disc increased for both "Shelf" and "Archival" after the durability test as compared with the BER prior to the test, while the magneto-optical disk of the Example showed absolutely no change, confirming the superiority of the present invention.

As shown above, according to the present invention, it is possible to provide a highly reliable optical information recording medium with a high reproduction C/N ratio, to which dirt, dust and the like cannot adhere.

Furthermore, the present invention was explained above using a magneto-optical recording disc as an example, but it is also possible to obtain the same type of results in the case where the present invention is used as an optical information recording medium with metals such as Al, Au, Tu, Bi and the like or pigments, and phase-changing recording materials in the recording layer.

What is claimed is:

1. An optical information recording medium comprising a transparent substrate, a recording layer provided on said substrate, which is transparent with respect to a light beam for reproducing information recorded in said recording layer, a reflection layer provided on said recording layer, and an anti-reflection layer provided on the back side of said substrate opposite to said recording layer, said anti-reflection layer comprising a plurality of overlaid layers, at least one of said layers being a transparent electroconductive layer, further comprising an interference layer interposed between said transparent substrate and said recording layer; and an electroconductive layer which is interposed between said transparent substrate and said interference layer, so that said transparent substrate has a sheet resistance of not more than 10 k$\Omega$/□ on the side on which said interference layer is provided.

2. The optical information recording medium as claimed in claim 1, wherein said transparent electroconductive layer comprises at least one component selected from the group consisting of $In_2O_3$, ITO, $SnO_2$, and ZnO.

3. The optical information recording medium as claimed in claim 1, wherein at least one of aid overlaid layers in said anti-reflection layer is a transparent insulating layer.

4. The optical information recording medium as claimed in claim 3, wherein said transparent insulating layer comprises a component selected from the group consisting of magnesium fluoride, silicon monoxide, silicon dioxide, titanium oxide, cerium oxide, and aluminum oxide.

5. The optical information recording medium as claimed in claim 1, wherein said electroconductive layer interposed between said transparent substrate and aid interference layer is a metal layer with a thickness of 30 Å to 150 Å.

6. The optical information recording medium as claimed in claim 5, wherein said metal layer comprises a metal component selected from the group consisting of Au, Ag, Cu, Pd, Pt, Al, Cr and Rh, and alloys of any of the aforesaid metals.

7. The optical information recording medium as claimed in claim 1, wherein said transparent substrate comprises a resin selected from the group consisting of polycarbonate, polymethyl methacrylate, and amorphous polyolefin.

8. The optical information recording medium as claimed in claim 1, wherein said transparent substrate comprises a glass plate and a pregrooved resin layer formed on said glass plate.

9. The optical information recording medium as claimed in claim 1, wherein said transparent substrate has a thickness in the range of 0.6 to 1.2 mm.

10. The optical information recording medium as claimed in claim 1, wherein said recording layer comprises an amorphous alloy of a rare earth element and a transition metal, having an axis of easy magnetization perpendicular to the surface of said recording layer.

11. The optical information recording medium as claimed in claim 10, wherein said amorphous alloy of said recording layer is selected from the group consisting of TbFeCo, NdDyFeCo, and TbDyFeCo.

12. The optical information recording medium as claimed in claim 10, wherein said recording layer has a thickness of 200 Å to 400 Å.

13. The optical information recording medium as claimed in claim 4, wherein said recording layer comprises a metal oxide with an axis of easy magnetization perpendicular to the surface of said recording layer.

14. The optical information recording medium as claimed in claim 13, wherein said metal oxide is selected from the group consisting of $BaFe_{12}O_{19}$, $CoFeO_4$, and $(Bi, Y)_3Fe_5O_{12}$.

15. The optical information recording medium as claimed in claim 13, wherein said recording layer has a thickness of 1000 Å to 5000 Å.

16. The optical information recording medium as claimed in claim 1, wherein said recording layer comprises a polycrystalline alloy selected from the group consisting of MnBi and CoPt, with an axis of easy magnetization perpendicular to the surface of said recording layer.

17. The optical information recording medium as claimed in claim 7, wherein said interference layer has a refractive index of at least 1.8.

18. The optical information recording medium as claimed in claim 19, wherein said metal sulfide is ZnS.

19. The optical information recording medium as claimed in claim 1, wherein said interference layer comprises at least one component selected from the group consisting of a metal oxide, a metal nitride, an inorganic carbide, and a metal sulfide.

20. The optical information recording medium as claimed in claim 19, wherein said metal oxide is selected from the group consisting of SiO, $SiO_2$, $Al_2O_3$, and $Ta_2O_5$.

21. The optical information recording medium as claimed in claim 19, wherein said metal nitride is selected from the group consisting of Si nitride, Al nitride, Zr nitride and Ge nitride.

22. The optical information recording medium as claimed in claim 1, wherein said interference layer has a thickness of 500 Å to 2000 Å.

* * * * *